United States Patent
Rath et al.

(10) Patent No.: US 10,927,927 B2
(45) Date of Patent: Feb. 23, 2021

(54) TENSIONING DEVICE FOR A STIRRED BALL MILL WITH A BELT OR CHAIN DRIVE, AND STIRRED BALL MILL

(71) Applicant: NETZSCH-Feinmahltechnik GmbH, Selb (DE)

(72) Inventors: Philipp Rath, Selb (DE); Martin Betzl, Waldsassen (DE)

(73) Assignee: NETZSCH-Feinmahltechnik GmbH, Selb (DE)

( * ) Notice: Subject to any disclaimer, the term of this patent is extended or adjusted under 35 U.S.C. 154(b) by 582 days.

(21) Appl. No.: 15/562,451

(22) PCT Filed: Feb. 18, 2016

(86) PCT No.: PCT/DE2016/000064
§ 371 (c)(1),
(2) Date: Feb. 6, 2018

(87) PCT Pub. No.: WO2016/165680
PCT Pub. Date: Oct. 20, 2016

(65) Prior Publication Data
US 2018/0209517 A1    Jul. 26, 2018

(30) Foreign Application Priority Data
Apr. 14, 2015   (DE) .......................... 102015105655.0

(51) Int. Cl.
*F16H 7/12* (2006.01)
*B02C 17/24* (2006.01)
*B02C 17/16* (2006.01)

(52) U.S. Cl.
CPC ........... *F16H 7/1281* (2013.01); *B02C 17/16* (2013.01); *B02C 17/163* (2013.01); *B02C 17/24* (2013.01)

(58) Field of Classification Search
CPC .... F16H 7/1281; F16H 7/1209; F16H 7/0829; F16H 2007/0802; F16H 2007/0842; B02C 17/16; B02C 17/163; B02C 17/24
See application file for complete search history.

(56) References Cited

U.S. PATENT DOCUMENTS

| | | | |
|---|---|---|---|
| 3,995,818 A | 12/1976 | Skeen, Jr. | |
| 4,757,383 A | 7/1988 | Tanaka | |
| (Continued) | | | |

FOREIGN PATENT DOCUMENTS

| | | |
|---|---|---|
| DE | 29710013 U1 | 8/1997 |
| DE | 102008045887 A1 | 4/2009 |
| EP | 2777815 A1 | 9/2014 |

OTHER PUBLICATIONS

International Search Report & Written Opinion Application No. PCT/DE2016/000064 Completed Date: Jun. 10, 2016; dated Jun. 29, 2016 10 Pages.

(Continued)

*Primary Examiner* — Michael R Mansen
*Assistant Examiner* — Robert T Reese
(74) *Attorney, Agent, or Firm* — Whitmyer IP Group LLC

(57) ABSTRACT

An invention relating to a tensioning device for the belt or chain drive of a stirred ball mill and to a stirred ball mill. The tensioning device includes a tensioning lever which is arranged on a rotatable tensioning foot and which includes a tensioning wheel. A rotatable adjusting disk with a guide contour is arranged on the rotatable tensioning foot. The position of the adjusting disk can be fixed on the machine housing of the stirred ball mill by means of a securing means paired with the guide contour of the adjusting disk. The tensioning device further includes a longitudinally variable tensioning element for rotating the adjusting disk relative to the machine housing of the stirred ball mill.

18 Claims, 3 Drawing Sheets

Fig.5

(56) References Cited

U.S. PATENT DOCUMENTS

| | | | | |
|---|---|---|---|---|
| 4,767,383 A | * | 8/1988 | St. John | F16H 7/1281 |
| | | | | 474/111 |
| 2003/0192776 A1 | * | 10/2003 | Sousek | F16H 7/1209 |
| | | | | 198/814 |
| 2005/0211808 A1 | * | 9/2005 | Geiger | B02C 17/161 |
| | | | | 241/172 |
| 2008/0119310 A1 | * | 5/2008 | Holcombe | F16H 7/1281 |
| | | | | 474/135 |
| 2011/0036935 A1 | * | 2/2011 | Stehr | B02C 17/161 |
| | | | | 241/69 |
| 2011/0207568 A1 | * | 8/2011 | Smith | F16H 7/1281 |
| | | | | 474/135 |
| 2014/0309882 A1 | * | 10/2014 | Antchak | F02B 67/06 |
| | | | | 701/36 |
| 2015/0344230 A1 | * | 12/2015 | Hollatz | B65G 23/24 |
| | | | | 460/114 |
| 2016/0025193 A1 | * | 1/2016 | Wheatley | F16H 25/2018 |
| | | | | 241/101.71 |
| 2017/0268636 A1 | * | 9/2017 | Musil | F16H 7/02 |
| 2018/0058551 A1 | * | 3/2018 | Takahashi | F16H 7/1281 |

OTHER PUBLICATIONS

Translation of International Search Report Application No. PCT/DE2016/000064 Completed Date: Jun. 10, 2016; dated Jun. 29, 2016 2 Pages.

* cited by examiner

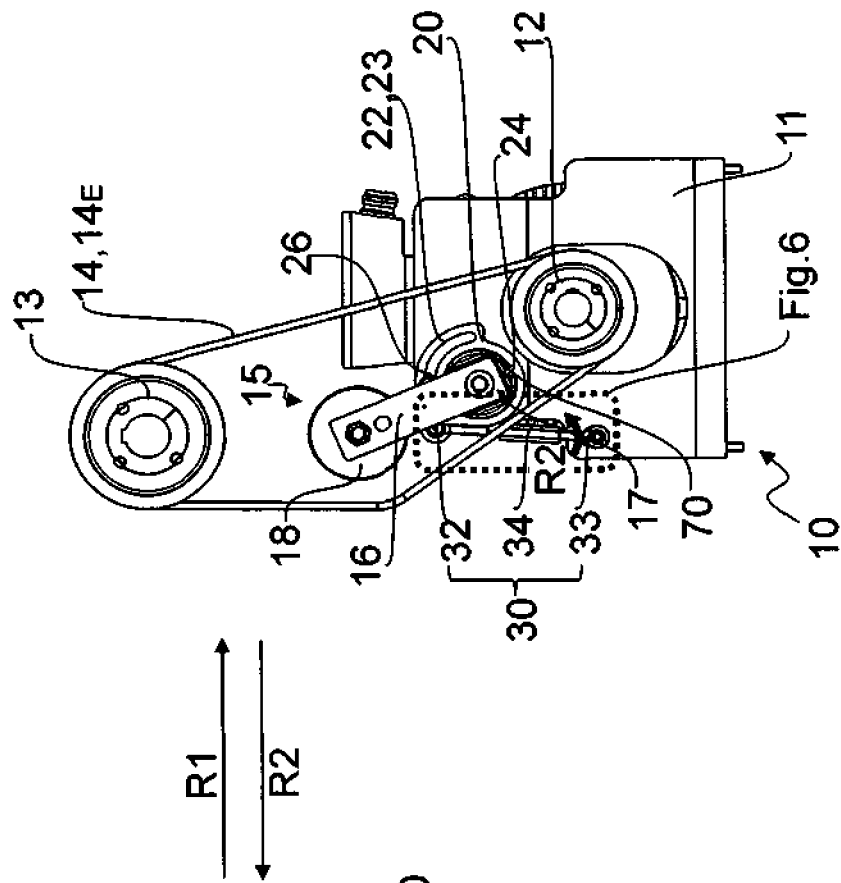
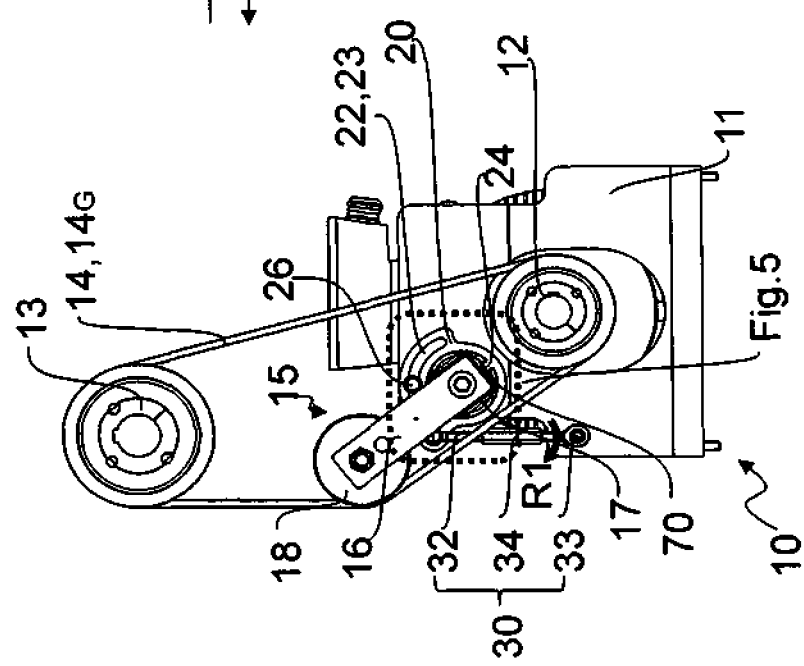

TENSIONING DEVICE FOR A STIRRED BALL MILL WITH A BELT OR CHAIN DRIVE, AND STIRRED BALL MILL

TECHNICAL FIELD

The present invention relates to a tensioning device for a stirred ball mill with a belt or chain drive and to a stirred ball mill.

BACKGROUND

The invention relates to a stirred ball mill in which the stir shaft of the stir mill is operated via a belt or chain drive. It is customary to power such stir mills by employing gear works, which require considerable space and oil lubrication, sometimes causing soiling by leaked gear oil. In addition, differences in rotating speeds require separately configured gear works, leading to high costs.

To reduce costs it is known to power the stir shaft by rotary operation by means of a belt drive, in particular a toothed or V-belt drive.

Patent DE 29710013 U1 describes a stir mill in which the power drive is a belt drive. In this document a belt-tensioning adjusting device is described that comprises a fixed bearing and a floating bearing placed at a distance in the axial direction.

Patent DE 102008045887 A1 describes a belt-driven submersible mixer with a preferably round-shaped bell housing to which the center of the impeller shaft is eccentrically mounted and such that the bell housing fits to an interacting round arrangement in a connecting housing. The belt of the belt drive is tensioned after placement on the belt disk while the bell housing is joined to the connecting housing. By rotating the two housings relative to one another, the necessary tension can be exerted on the belt.

Additional known belt tensioning systems are marketed, for example, by the ROST company. It is a particular problem with the known systems that in each case two person are required in order to exert the belt tension, since one person must adjust and maintain the desired belt tension with the help of an appropriate tool, while the other person retains the particular adjustment by means of fastening screws or the like.

It is the object of the invention to construct a tensioning device integrated in a stirred ball mill, by means of which the belt tension of a belt drive of a stirred ball mill can be adjusted quickly and easily.

Said object is achieved by a tensioning device and a stirred ball mill that have the features described below and shown in the figures.

SUMMARY

The invention relates to a tensioning device for the belt or chain drive of a stirred ball mill as well as to a stirred ball mill with belt or chain drive and with a tensioning device for the belt or chain drive.

With the inventive stirred ball mill, to transmit the drive energy from a drive shaft of a motor to a shaft of a stirring device of the stirred ball mill, a belt or chain is used, which connects the drive shaft with the stir mill shaft. In the context of this application, the term "belt" is used as a synonym for a belt or chain or other appropriate transmission means.

To apply the necessary tension to the belt in each case, the tensioning device includes a tensioning lever positioned on a rotatably configured tensioning foot with a tensioning wheel mounted on it.

The tensioning wheel is preferably configured to correspond with the transmission means. If a chain is employed as transmission means, the tensioning wheel is configured as a chain wheel, for example, and can comprise outer teeth that engage with the chain members. If the transmission means is configured as a belt, then the tensioning wheel can be configured, for example, as a type of roller.

A rotatable adjusting disk is positioned on the rotatable tensioning foot. In particular, the adjusting disk is positioned between the rotatable tensioning foot and the machine housing of the stirred ball mill. The adjusting disk is preferably secured rotatably in its center point on the machine housing. The tensioning foot is positioned on the adjusting disk in such a way that rotation of the adjusting disk causes rotation of the tensioning foot, leading in turn to an adjustment of the tensioning lever and a change of position of the tensioning wheel. At that point the tensioning wheel is pressed with more or less force against the belt. The adjusting disk comprises a guide groove or guide contour. For example, the guide contour is configured as a slot. Especially preferably, the guide contour is configured as an arched slot.

Paired with the guide contour of the adjusting disk is at least one securing means, with which the position of the adjusting disk on the machine housing of the stirred ball mill can be fixed. For example, a screw driven into the machine housing of the stirred ball mill and through a portion of the guide contour of the adjusting disk can serve as securing means.

In particular, it is expected that the screw head has a greater diameter than the semicircle that completes the narrow side of the slot. This ensures that the screw head cannot slip through the slot. On the other hand, the screw portion of the securing means is smaller in diameter.

If the adjusting disk is to be rotated, then the securing means is released, at least to the extent that the adjusting disk is no longer fixed immovably on the machine housing of the stirred ball mill, but instead can be moved about its rotation point. Upon rotating the adjusting disk, the guide contour is adjusted relative to the securing means. The motion of the adjusting disk is then restricted, for example, by the dimensions of the slot.

As a result of the direct coupling of the adjusting disk with the tensioning foot and the direct coupling of the tensioning foot with the tensioning lever and tensioning wheel, the motion of the adjusting disk is transmitted to the tensioning wheel, so that the tensioning wheel is pressed with more or less force against the belt. In particular, a rotary motion of the adjusting disk leads to a rotary motion of the tensioning foot, causing a pivoting of the tensioning lever and thus a pivoting of the tensioning wheel.

After the desired belt tension has been selected, the securing means is again applied and thus the adjusting disk is fixed in the adjusted position on the machine housing of the stirred ball mill.

To adjust the adjusting disk, in particular to rotate the adjusting disk relative to the machine housing of the stirred ball mill, the inventive tensioning device includes a longitudinally variable tensioning element. According to a preferred embodiment of the invention, the longitudinally variable tensioning element is configured in such a way that a rotary motion on the tensioning element is converted to a linear adjusting motion of the tensioning element. The tensioning element engages on the adjusting disk and transmits the linear adjusting motion to the adjusting disk in such a way that the latter is rotated about its rotation point on the machine housing of the stirred ball mill.

According to one embodiment of the invention, the longitudinally variable tensioning element includes a clamping sleeve and two eyebolts. The clamping sleeve is configured, in particular, by a hollow cylinder, which on one free end at least partly comprises a first, right-handed inner thread. At the opposite free end, the clamping sleeve comprises at least partly a second, left-handed inner thread. In particular, the first, right-handed inner thread and the second, left-handed inner thread are positioned on the same axis, preferably on the longitudinal axis of the clamping sleeve.

According to an alternative embodiment of the invention, the longitudinally variable tensioning element includes a so-called clamping sleeve, which is produced from a solid material. With this embodiment, two inner threads are foreseen, situated opposite one another. In particular, the inner threads are coaxially positioned and one of the threads is configured as a right-handed thread, while the other is configured as left-handed.

Analogously, a first eyebolt comprises an outer, right-handed thread corresponding to the first, right-handed inner thread. Conversely, the second eyebolt comprises an outer, left-handed thread corresponding to the second, left-handed inner thread.

By rotating the clamping sleeve in a first rotating direction, the two eyebolts are drawn together, so that the tensioning element is shortened and a first rotary motion of the adjusting disk generates a first adjusting rotary direction. By rotating the clamping sleeve in a counter-direction set contrary to the first rotary direction, the two eyebolts are distanced from one another, so that the tensioning element is lengthened and a second rotary motion of the adjusting disk generates a second adjusting rotary direction, such that the second adjusting rotary direction is contrary to the first adjusting rotary direction.

The particular advantage of such an inventive tensioning device for a stirred ball mill with belt or chain drive, or an inventive stirred ball mill, consists in the fact that the belt or chain drive of the stirred ball mill can be tensioned nearly without tools. Merely one tool is required in order to release the securing means or to fix it again in place. However, no additional tool is required in order to adjust the tensioning foot of the tensioning device.

Depending on the size of the tensioning device and/or depending on the accessibility of the tensioning device on the stirred ball mill, it can be advantageous to adjust the tensioning device accordingly, with the help of a suitable tool, for instance with the help of a jaw spanner or the like.

In particular, the adjustment of the belt tension no longer requires two persons, with one person adjusting and maintaining the belt tension and the second person fixing the adjustment by various securing means. Instead, adjustment is possible by just a single person, because the tensioning element independently holds the applied belt tension and fixing it with the help of the securing means becomes merely a back-up function.

If now, in the ongoing operation of the stirred ball mill, the clamping sleeve of the tensioning element should rotate relative to the eyebolts of the tensioning element, so that an undesired change in length of the tensioning element occurs, then the fixing of the adjusting disk on the machine housing of the stirred ball mill ensures that the undesired change in length of the tensioning element is not transmitted to the tensioning foot, the tensioning lever, the tensioning wheel and finally to the belt during the operation of the stirred ball mill.

BRIEF DESCRIPTION OF THE DRAWINGS

Embodiments presented below serve to describe the invention and its advantages in greater detail with reference to the appended drawings. Size proportions among the individual elements in the drawings do not always correspond to actual size ratios, since some shapes are simplified and others are shown enlarged in comparison to other elements for a clearer presentation.

FIGS. 3 and 4 each show a stirred ball mill with an inventive tensioning device.

Identical reference numbers are used for identical or identically acting elements of the invention. In addition, for the sake of a clear overview, only references numbers that are necessary for the description of the respective figure are shown in the individual figures. The illustrated embodiments merely constitute examples of how the invention can be configured and do not represent any conclusive restriction.

DETAILED DESCRIPTION

Figure 1:
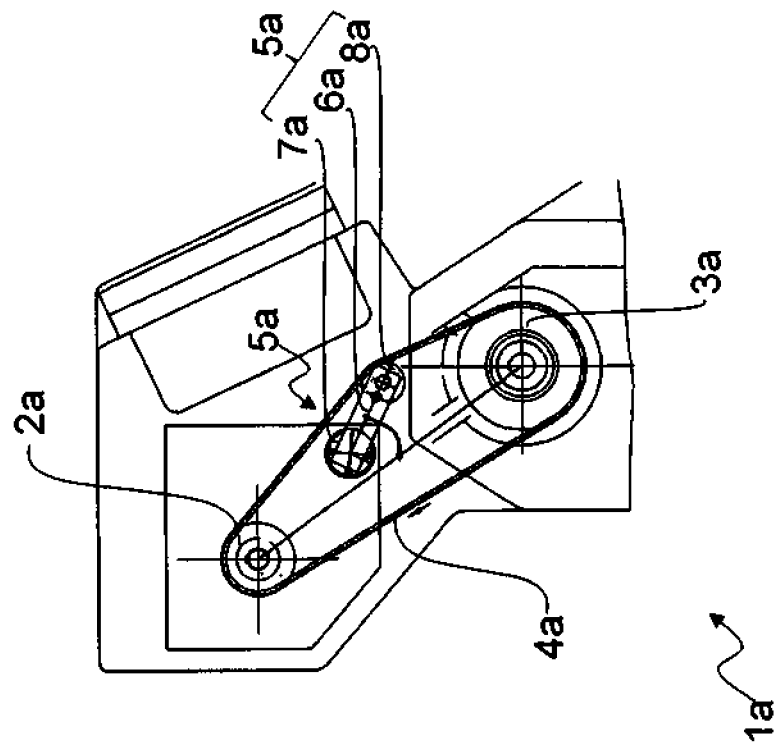
FIG. 1 shows a first embodiment of a stirred ball mill with a tensioning device according to the known prior art.

FIG. 1 shows a first embodiment of a stirred ball mill 1a with a tensioning device 5a according to the known prior art. The stir shaft 3a of the stirred ball mill 1a is powered by a drive shaft 2a via a chain or belt 4a. The tensioning device 5a is provided to adjust the required belt tension of the belt 4a. The device includes a tensioning lever 6a, positioned on a tensioning foot 7a, with a tensioning wheel 8a. To select the tension of the belt 4a, the user must first slacken the securing means (not illustrated) on the tensioning foot 7a in order to be able to adjust it. Then the user must use a tool on the tensioning foot 7a, rotating it with the help of the tool. The rotary motion is transmitted via the tensioning lever 6a to the tensioning wheel 8a, which is thereby pressed against the belt 4a with more or less force depending on the rotary direction. After the desired belt tension is achieved, the securing means must be applied by a second user in order to fix the tensioning foot 7a in the new setting.

Figure 2:
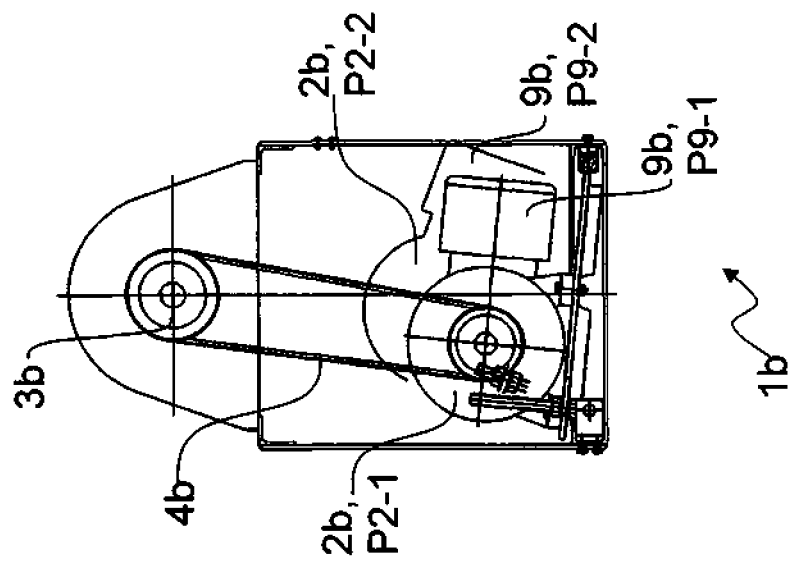
FIG. 2 shows a second embodiment of a stirred ball mill according to the known prior art.

FIG. 2 shows a second embodiment of a stirred ball mill 1b according to the known prior art. In this embodiment the belt tension of the belt 4b connecting the stir shaft 3b with the drive shaft 2b is adjusted in that the drive 9b or motor is mounted in a variable position on the stirred ball mill 1b. For example, a pivot mechanism or the like is foreseen, so that the drive 9b can assume various positions P9-1, P9-2, which situate the drive shaft 2b in various positions P2-1, P2-2, so that the tension of the belt 4b changes accordingly.

Figure 6:
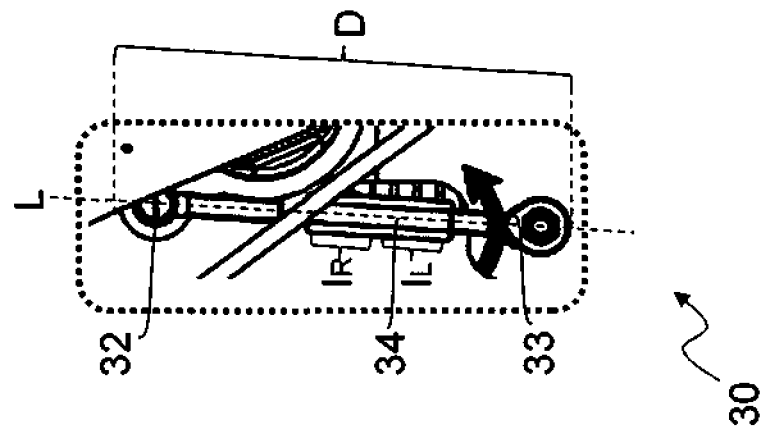
FIG. 6 shows a detail view from FIG. 4.
Figure 5:
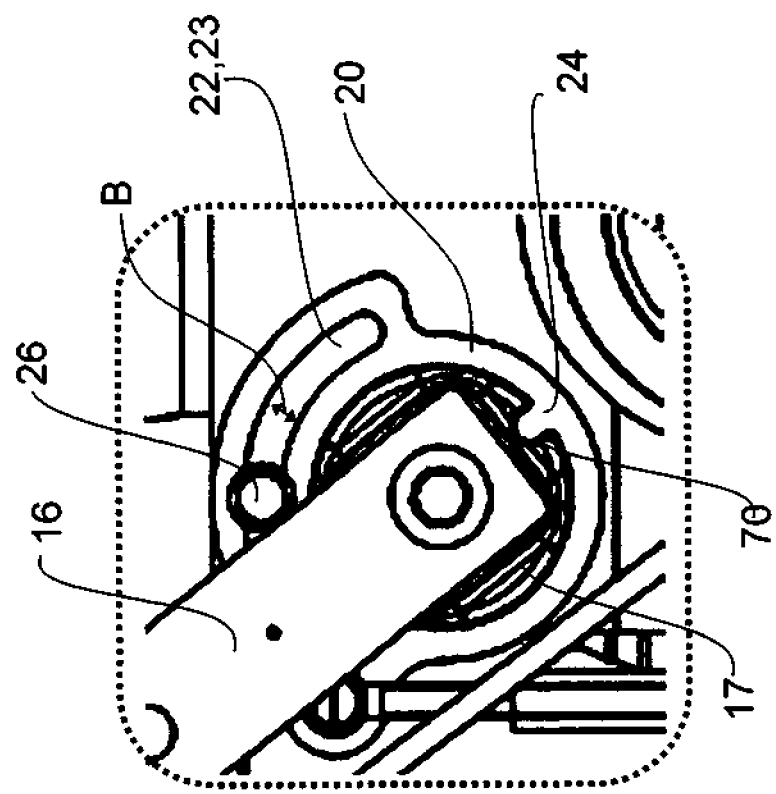
FIG. 5 shows a detail view from FIG. 3.

FIGS. 3 and 4 each show a stirred ball mill 10 with inventive tensioning device 15, such that FIG. 3 depicts the stirred ball mill 10 with tensed belt 14G and FIG. 4 shows the stirred ball mill 10 with slackened belt 14E. FIG. 5 shows a detail from FIG. 3 and FIG. 6 shows a detail from FIG. 4.

As is known from the prior art, a belt 14 also serves here to transmit the drive energy from a drive shaft 12 to a stir shaft 13 of the stirred ball mill 10.

In the inventive tensioning device 15, the tensioning foot 17, on which the tensioning lever 16 and on it the tensioning wheel 18 are positioned, is positioned on or in an adjusting disk 20. The adjusting disk 20 is rotatably positioned on the machine housing 11 of the stirred ball mill 10. The adjusting disk 20 comprises a securing tab 24, which engages in a correspondingly configured groove 70 on the tensioning foot 17. The tensioning foot 17 and the adjusting disk 20 are thereby connected with one another non-rotatably; that is, any motion of the adjusting disk 20 is transmitted directly to the tensioning foot 17 and via the tensioning lever 16 further to the tensioning wheel 18.

The adjusting disk 20 comprises an arch-shaped guide groove or guide contour 22. In particular, the guide contour 22 is configured as an arched slit 23.

In addition, a securing means 26 is foreseen, by which the adjusting disk 20 can be secured non-rotatably on the machine housing 11 of the stirred ball mill 10. The securing means 26 penetrates the adjusting disk 20 in the area of the guide contour 22 and in addition is attached to the machine housing 11. A screw, for example, can serve as securing means 26, such that the diameter of the screw-in section is smaller than a width B of the guide contour 22 and the diameter of the screw head is greater than a width of the guide contour 22—see also, in particular, FIG. 5. If the securing means 26 is released or at least slackened, the adjusting disk 20 can be rotated. If the securing means 26, on the other hand, is tightened or otherwise fixed on the machine housing, then the adjusting disk 20 is secured on the machine housing 11. This means, however, that the tensioning foot 17 and in addition the tensioning lever 16 and tensioning wheel 18 are also fixed in their respective positions.

In addition, a longitudinally variable tensioning means 30 is foreseen, which is attached, first, to the rotatable adjusting disk 20 and, second, to the machine housing 11 of the stirred ball mill 10. Modification of the length D of the tensioning means 30 leads to rotation of the adjusting disk 20. In particular, modification of the length D of the tensioning means 30 causes a change of position of the guide contour 22 of the adjusting disk 20 relative to the machine housing 11 of the stirred ball mill 10 and relative to the securing means 26.

Because the motion of the adjusting disk 20 is transmitted by the tensioning foot 17 directly to the tensioning lever 16 and tensioning wheel 18, rotation of the adjusting disk in a first rotating direction R1 causes the tensioning wheel 18 to move away from the belt 14, so that it is slackened. If the adjusting disk 20, conversely, is rotated in the counter-direction R2, then the tensioning wheel 18 moves in the direction of the belt 14. Rotation of the adjusting disk in the second counter-direction R2 has the effect that the tensioning wheel 18 moves in the direction of the belt 14 and thus is pressed more strongly onto the belt 14.

The tensioning means 30 consists in particular of two eyebolts 32, 33, which engage from opposite sides with a clamping sleeve 34. One of the eyebolts, for example a first eyebolt 32, comprises a right-hand thread and the other, second eyebolt 33 comprises a left-hand thread. The clamping sleeve 34, in the area of a first free end, comprises a first, right-hand inner thread IR, and a second, left-handed inner thread IL is configured in the area of a second free end of the clamping sleeve 34. The first, right-handed inner thread IR and the second, left-handed inner thread IL of the clamping sleeve 34 are arranged flush with the longitudinal axis L of the clamping sleeve 34.

By rotating the clamping sleeve 34, the two threaded rods of the eyebolts 32, 33 are drawn together or placed farther apart, depending on the direction in which the clamping sleeve 34 is rotated. That is, the rotary motion of the clamping sleeve 34 is converted to a linear adjusting motion of the tensioning means 30. Because the first eyebolt 32 is secured directly on the rotatably mounted adjusting disk 20, the motion of the tensioning means 30 is transmitted directly to the adjusting disk 20 and is thereby converted, in particular, to a rotary motion of the adjusting disk 20. This means that the linear adjusting motion of the tensioning means 30 is converted to a rotary motion of the adjusting disk 20. In particular, the adjusting disk 20 is rotated relative to the securing means 26, which is paired with the guide contour 22 and released for the adjusting process. After the desired belt tension of the belt 14 is obtained, the securing means 26 is again tightened, and thus the position of the adjusting disk 20 is secured on the machine housing 11 of the stirred ball mill 10 and protected against undesired rotation.

The invention has been described with reference to a preferred embodiment. However, it is also possible for a person skilled in the art to execute adaptations or modifications of the invention without thereby departing from the protected scope of the claims listed below.

What is claimed is:

1. A tensioning device for the belt or chain drive of a stirred ball mill comprising:
    a tensioning lever positioned on a rotatably configured tensioning foot and having a tensioning wheel,
    wherein a rotatable adjusting disk with guide contour is positioned on the rotatable tensioning foot,
    wherein the position of the adjusting disk can be secured on a machine housing by means of at least one securing means that is paired with the guide contour of the adjusting disk,
    wherein the tensioning device comprises a longitudinally variable tensioning element for rotating the adjusting disk relative to the machine housing of the stirred ball mill,
    wherein the longitudinally variable tensioning element includes a clamping sleeve that can be adjusted by means of an appropriate tool.

2. The tensioning device according to claim 1, wherein the adjusting disk is positioned on the rotatable tensioning foot in such a way that a rotary motion of the adjusting disk is directly coupled with a rotary motion of the tensioning foot.

3. The tensioning device according to claim 2, wherein the longitudinally variable tensioning element is configured in such a way that a rotary motion on the clamping sleeve can be converted to a linear adjusting motion of the tensioning element.

4. The tensioning device according to claim 2, wherein the longitudinally variable tensioning element includes two eyebolts.

5. The tensioning device according to claim 1, wherein the longitudinally variable tensioning element is configured in such a way that a rotary motion on the clamping sleeve can be converted to a linear adjusting motion of the tensioning element.

6. The tensioning device according to claim 5, wherein a rotary motion of the adjusting disk and thus a rotary motion of the tensioning foot, of the tensioning lever and of the tensioning wheel can be generated by the linear adjusting motion of the tensioning element.

7. The tensioning device according to claim 1, wherein the longitudinally variable tensioning element includes two eyebolts.

8. The tensioning device according to claim 7, wherein a first, right-handed inner thread (IR) is configured in the area of a first free end of the clamping sleeve and wherein a second, left-handed inner thread (IL) is configured in the area of a second free end of the clamping sleeve, such that the first, right-handed inner thread (IR) and the second, left-handed inner thread (IL) are positioned on the same axis (L).

9. The tensioning device according to claim 8, wherein one of the eyebolts includes a right-handed thread and wherein the other eyebolt includes a left-handed thread.

10. The tensioning device according to claim 8, wherein the clamping sleeve is configured as a hollow cylinder.

11. The tensioning device according to claim 8, wherein the clamping sleeve is made of a solid material and includes two inner threads mounted opposite one another, in particular wherein the opposite-mounted inner threads are positioned coaxially.

12. The tensioning device according to claim 7, wherein one of the eyebolts includes a right-handed thread and wherein the other eyebolt includes a left-handed thread.

13. The tensioning device according to claim 7, wherein the clamping sleeve is configured as a hollow cylinder.

14. The tensioning device according to claim 7, wherein the clamping sleeve is made of a solid material and includes two inner threads mounted opposite one another, in particular wherein the opposite-mounted inner threads are positioned coaxially.

15. The tensioning device according to claim 7, wherein the clamping sleeve can be adjusted by means of an appropriate tool.

16. The tensioning device according to claim 1, wherein the belt or chain drive of the stirred ball mill can be tensioned without use of tools by means of the tensioning device, wherein the tensioning element holds an applied belt tension while the at least one securing means is unfastened.

17. A stirred ball mill with a belt or chain drive and a tensioning device for the belt or chain drive, said tensioning device including:
    a tensioning lever positioned on a rotatably configured tensioning foot with a tensioning wheel,
    wherein a rotatable adjusting disk with guide contour is positioned on the rotatable tensioning foot,
    wherein the position of the adjusting disk on a machine housing can be secured by at least one securing means paired with the guide contour of the adjusting disk,
    wherein the tensioning device includes a longitudinally variable tensioning element for rotating the adjusting disk relative to the machine housing of the stirred ball mill,
    wherein the longitudinally variable tensioning element includes a clamping sleeve that can be adjusted by means of an appropriate tool.

18. The stirred ball mill according to claim 17,
    wherein the longitudinally variable tensioning element is configured in such a way that a rotary motion on the clamping sleeve can be converted to a linear adjusting motion of the tensioning element.

* * * * *